US008861488B2

(12) United States Patent
Vogety

(10) Patent No.: US 8,861,488 B2
(45) Date of Patent: Oct. 14, 2014

(54) DISTRIBUTED CLIENT INFORMATION DATABASE OF A WIRELESS NETWORK

(75) Inventor: Ramanagopal Vogety, Milpitas, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1993 days.

(21) Appl. No.: 11/491,536

(22) Filed: Jul. 24, 2006

(65) Prior Publication Data

US 2008/0019313 A1 Jan. 24, 2008

(51) Int. Cl.
*H04W 4/00* (2009.01)
*H04L 12/28* (2006.01)
*H04W 8/12* (2009.01)

(52) U.S. Cl.
CPC ...................................... *H04W 8/12* (2013.01)
USPC ............................. 370/338; 370/329; 370/400

(58) Field of Classification Search
CPC ... H04W 8/12; H04W 36/0016; H04W 80/04; H04W 8/26; H04W 60/00; H04W 36/0011; H04W 88/182; H04L 29/12264; H04L 61/2046
USPC ........ 455/433, 435.1, 435.5, 432.1, 524, 525, 455/435.2, 464, 552.1; 370/252, 235, 218, 370/254, 389, 338, 328
See application file for complete search history.

(56) References Cited

U.S. PATENT DOCUMENTS

| | | | |
|---|---|---|---|
| 5,490,203 A * | 2/1996 | Jain et al. ................... | 455/435.1 |
| 6,690,937 B1 * | 2/2004 | Pfeiffer ......................... | 455/445 |
| 6,791,949 B1 * | 9/2004 | Ryu et al. ...................... | 370/254 |
| 6,804,532 B1 * | 10/2004 | Moon et al. ................ | 455/552.1 |
| 6,910,149 B2 | 6/2005 | Perloff et al. | |
| 7,062,259 B1 | 6/2006 | Dispensa et al. | |
| 7,065,779 B1 | 6/2006 | Crocker et al. | |
| 7,221,646 B2 * | 5/2007 | Kawano et al. ............... | 370/218 |
| 7,826,869 B2 * | 11/2010 | Nagarajan et al. ........... | 455/560 |
| 2003/0179707 A1 * | 9/2003 | Bare ............................. | 370/235 |
| 2004/0081122 A1 * | 4/2004 | Koodli et al. ................ | 370/329 |
| 2004/0114559 A1 * | 6/2004 | Wang ............................ | 370/338 |
| 2004/0233855 A1 * | 11/2004 | Gutierrez et al. ............ | 370/252 |
| 2005/0036487 A1 * | 2/2005 | Srikrishna .................... | 370/389 |
| 2005/0172072 A1 | 8/2005 | Cochran et al. | |
| 2006/0245404 A1 * | 11/2006 | Bajic ............................ | 370/338 |
| 2007/0225028 A1 * | 9/2007 | Nelson et al. ................ | 455/524 |
| 2008/0008129 A1 * | 1/2008 | Nagarajan et al. ........... | 370/331 |

* cited by examiner

*Primary Examiner* — Nizar Sivji
(74) *Attorney, Agent, or Firm* — Brian R. Short

(57) ABSTRACT

A method of selecting access points of a wireless network as redundant aggregation devices is disclosed. The method includes monitoring parameters of the access points. A plurality of the access points are selected as redundant aggregation devices based upon the monitored access point parameters. Each of the redundant aggregation devices maintains client information parameters of clients associated with the wireless network.

18 Claims, 6 Drawing Sheets

US 8,861,488 B2

DISTRIBUTED CLIENT INFORMATION DATABASE OF A WIRELESS NETWORK

FIELD OF THE INVENTION

The invention relates generally to wireless communications. More particularly, the invention relates to a distributed client information database of a wireless network.

BACKGROUND OF THE INVENTION

FIG. 1 shows a wireless network. The wireless network includes gateways 120, 130, 140 (also referred to as access points) which provide a client device 150 with access to a wired network 150. The wired network can be connected to, for example, the internet 100. It is desirable for the client device 150 to be able to roam from one access point of the wireless network to another access point of the wireless network.

When the client roams from one access point to another, the new access point typically needs client information in order for the client to maintain a network connection throughout the roam. The new access point needs access to information about the client to allow the client device to seamlessly roam to the new access point.

One method of maintaining client information includes storing the client information at a centralized controller. If a new access point need the client information after a client roams to the new access point, the new access point can obtain the client information from the centralized controller.

A single centralized controller can be a liability if for some reason the centralized controller fails. That is, the centralized controller does not have a backup, and can be a single point of failure.

It is desirable to have a client information database of a wireless network that is redundant, but does not overly burden communication links of the wireless network.

SUMMARY OF THE INVENTION

A first embodiment includes a method of selecting access points of a wireless network as redundant aggregation devices. The method includes monitoring parameters of the access points. A plurality of the access points are selected as redundant aggregation devices based upon the monitored access point parameters. Each of the redundant aggregation devices maintains client information parameters of clients associated with the wireless network.

Another embodiment includes method of selecting gateways of a wireless mesh network as redundant aggregate devices. The method includes monitoring parameters of the gateways. Multiple gateways are selected as redundant aggregation devices based upon the monitored gateway parameters. Each of the redundant aggregation devices maintains client information parameters of clients associated with the wireless network.

Other aspects and advantages of the present invention will become apparent from the following detailed description, taken in conjunction with the accompanying drawings, illustrating by way of example the principles of the invention.

DETAILED DESCRIPTION

The invention includes a method and apparatus for selecting redundant aggregation devices for storing redundant client information databases within a wireless network. The wireless network can include wired access point or many gateways and access nodes forming a wireless mesh network. The redundant client information databases provide a new access point of a roaming client with client information. For the description provided, aggregation devices can include, for example, access points, gateways, access nodes, switches and/or servers.

When the client roams from one access point to another, the new access point typically needs client information in order for the client to maintain a network connection throughout the roam. The new access point needs access to information about the client to allow the client device to seamlessly roam to the new access point. One method of maintaining client information includes every access point in the wireless network maintaining client information of all clients attached to the network. That way, if a client roams, the new access point always has access to the client information.

Maintaining client information at all access points of the network can be desirable because if any access point fails, the client information is not lost because a copy of the client information is also stored within all of the other access points of the network. However, this high level of redundancy can overburden the network. Every time the client information changes, every one of the access points must be updated. For a large network with rapidly changing client information, the amount of information being conveyed through the network can be large enough to affect the throughput performance of the network.

Figure 1:
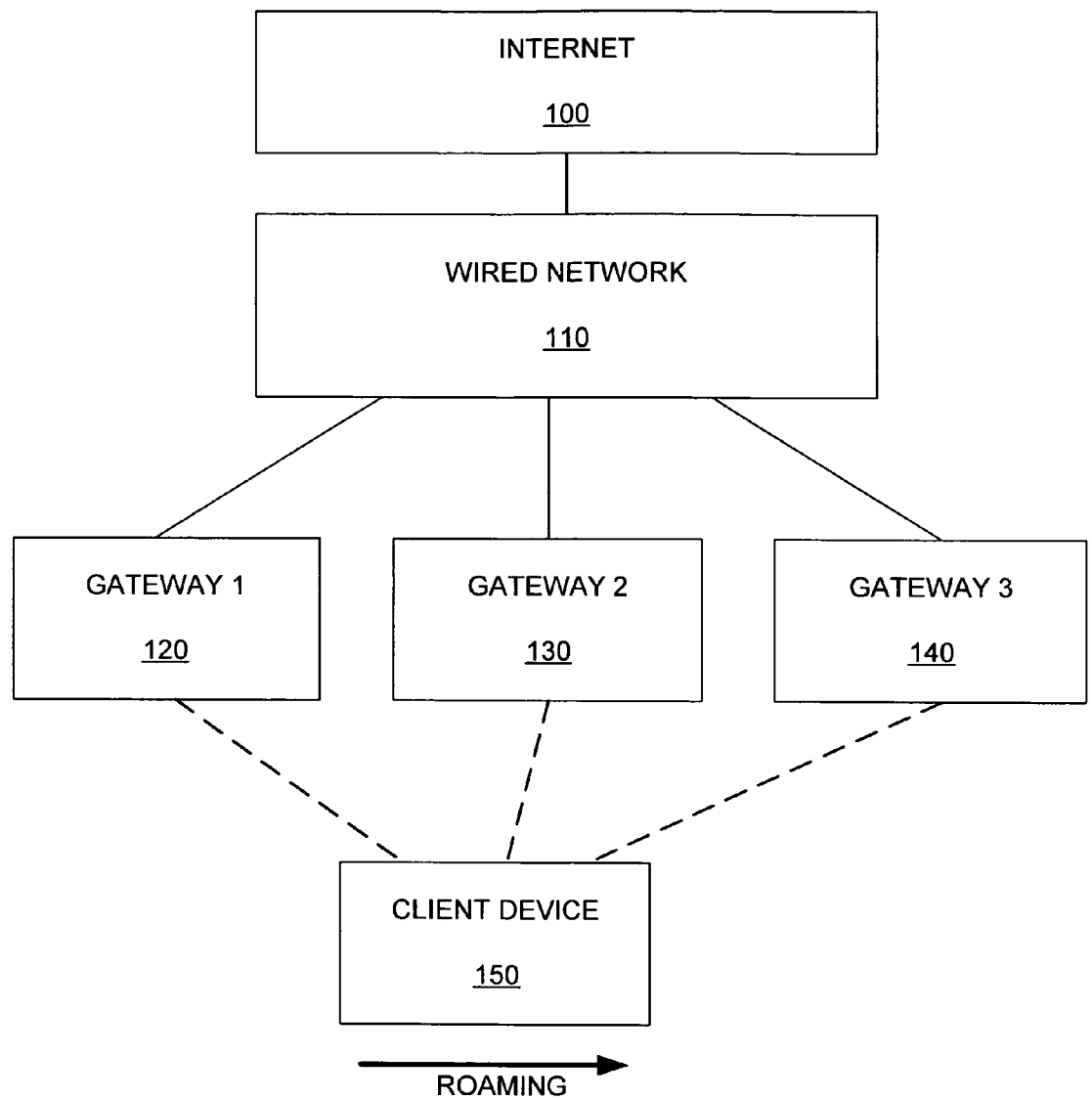
FIG. 1 shows a prior art wireless network that allows a client to roam within the network.
Figure 2:
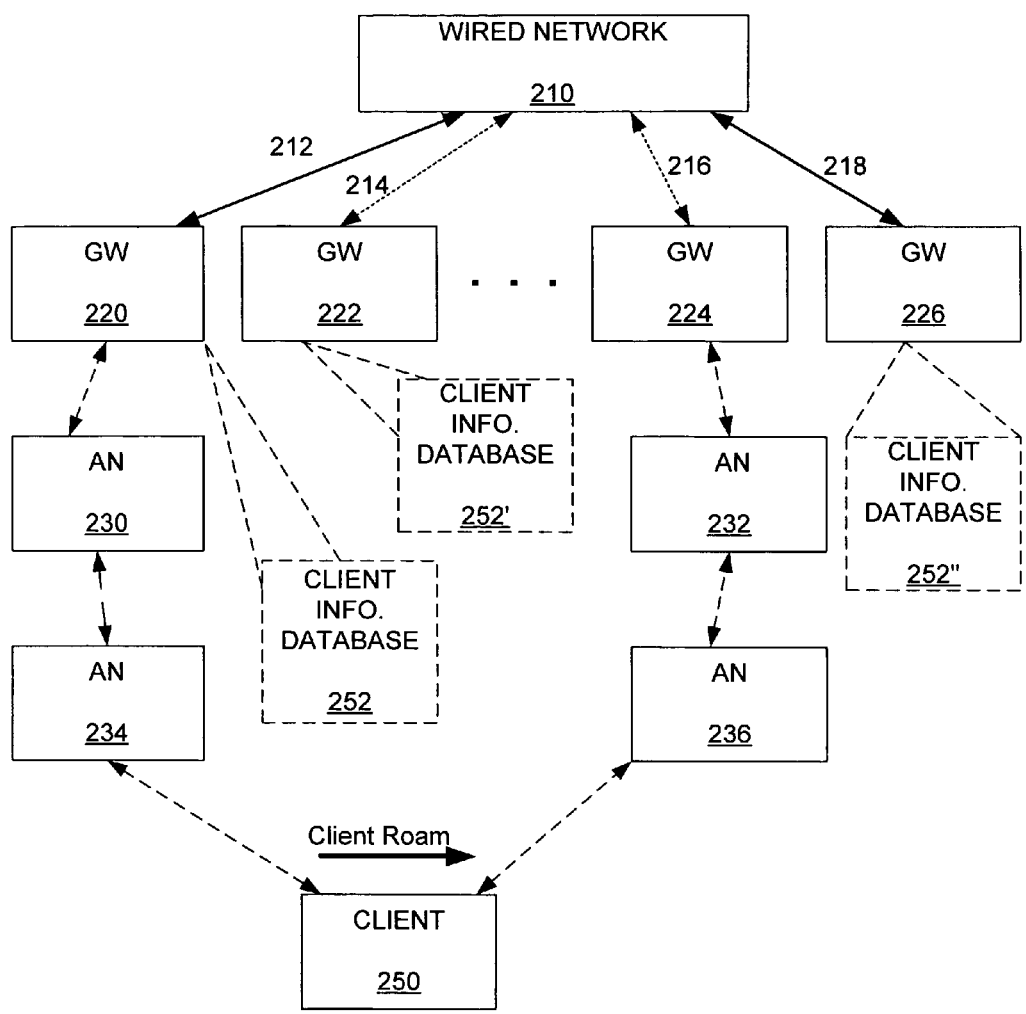
FIG. 2 shows an example of a wireless mesh network that includes redundant storage of a client information database.

FIG. 2 shows an example of a wireless mesh network that includes redundant storage of a client information database. The mesh network includes any number of gateways 220, 222, 224, 226 either wired or wirelessly connected (through backhaul connections 212, 214, 216, 218) to a wired network 210. As shown, access nodes 230, 232, 234, 236 can provide a client device 250 with a connection to the one of the gateways 220, 222, 224, 226, and therefore, a connection to the wired network 210. The wired network 210 can be connected to the internet.

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network. The client device can include a NIC (network interface card). The wireless clients can include a wireless to wired CPE (consumer premises equipment) bridge designed to accept a wireless backhaul connection while providing wire Ethernet connectivity inside a home. The wireless to wired CPE can connect one or more Ethernet-equipped client device (such as laptops or personal computers) to the wireless access network. Such a configuration can be referred to as "clients behind a CPE". The client device can be directly connected (for example, by Ethernet) to an Ethernet port on a wireless mesh access node. For example, the client device could be an IP video camera attached to an Ethernet port of street-light mounted mesh access node. This type of client device can be referred to as a "wired client".

The gateways 220, 222, 224, 226 can be directly connected to a client, or connected to the client through intermediate access nodes. For one embodiment, the gateways 220, 222, 224, 226 originate routing packets that are used by the access nodes to select optimal routing paths to a gateway. The gateways also defined subnets. That is, there is one gateway per subnet. For example, the gateway 220 defines a first subnet that includes access nodes 230, 234. The gateway 224 defines another subnet that includes access nodes 232, 236.

When a client roams from one subnet to another subnet, the gateway of the new subnet needs access client information of the client. One embodiment includes selected gateways of the mesh network maintaining a client information database. The number of selected gateways is typically much smaller than the total number of gateways of the wireless mesh network. Therefore, updating the client information database does not stress the network. That is, for example, for a large wireless network having a large number of gateways, the number of selected gateways can be one tenth of the total number of gateways of the network. Therefore, updating the client information database stored within the selected gateways required one tenth the data traffic as would be required if all of the gateways maintained the client information.

The number of gateways selected should always be greater than one, to provide redundancy. Therefore, if a selected gateway fails, then the client information is also available at another selected gateway. The selected gateways maintain the client information within a client information database, such as the client information database 252. The client information databases 252, 252', 252" are each associated with a different selected gateways. However, the client information within each of the client information databases 252, 252', 252" is the same.

If the client device 250 roams, for example, from the first subnet of the first gateway 220 to the second subnet of the second gateway 224, the second gateway needs access to the client information parameters. The second gateway 224 can obtain the client device 250 information parameters from, for example, one of the selected gateways 220, 222, 226 that have a client information database 252, 252', 252".

Figure 3:
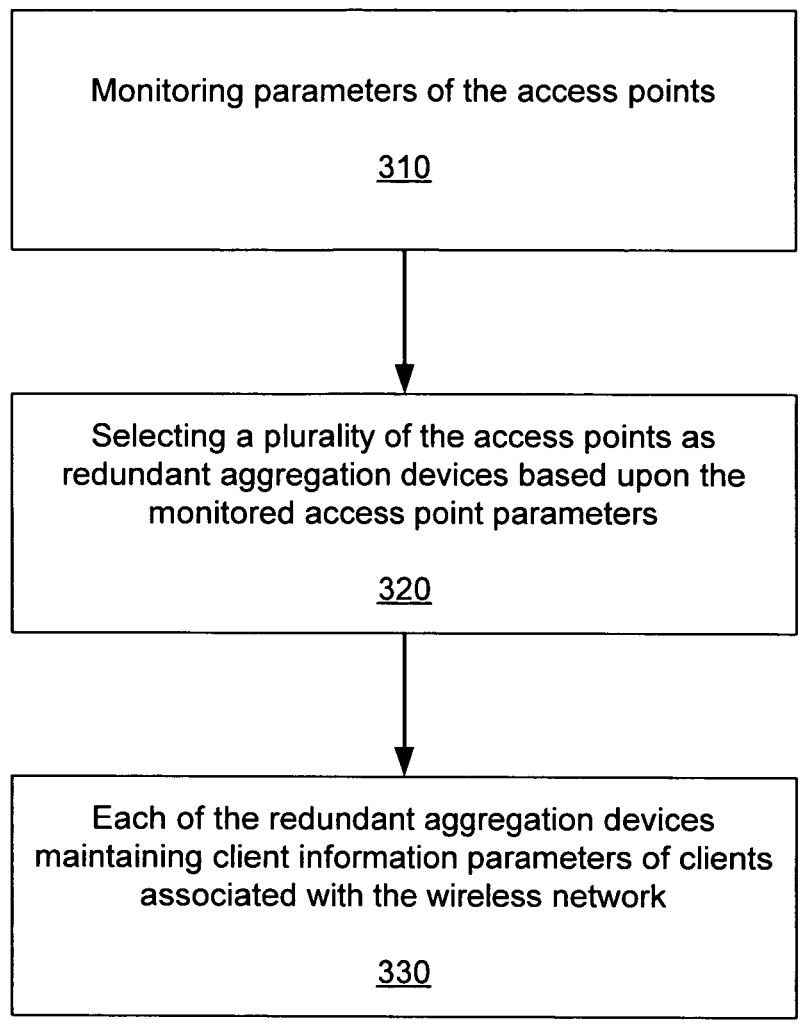
FIG. 3 is a flow chart that shows steps of an example of a method of selecting which of a plurality of gateways of a wireless mesh network are designated redundant aggregation devices.

FIG. 3 is a flow chart that shows steps of an example of a method of selecting which of a plurality of gateways of a wireless mesh network are designated redundant aggregation devices. A first step 310 includes monitoring parameters of the gateways. A second step 320 includes selecting a plurality of the gateways as redundant aggregation devices based upon the monitored gateway parameters. A third step 330 includes each of the redundant aggregation devices maintaining client information parameters of clients associated with the wireless network. It should be noted that the gateways can operate as access points as well as gateways between a wireless mesh network and a wired network.

Monitoring Parameters of the Gateways

Parameters of the gateways are monitored to determine which of the gateways of the wireless mesh network are most desirable as a redundant aggregation device. Typically, the number of redundant aggregation devices is greater than two for small networks, and less than one tenth of the total number of gateways for large networks. Parameters that can be monitored include, for example, a gateway uptime, how recently a database of the gateway has been updated, back haul link performance and a gateway priority. Generally, the gateways advertise these parameters.

Client Information Parameters

As previously described, the client information parameters are parameters that a new access node needs access to in order to provide a seamless transfer to the new access node. The client information parameters can include, for example, client MAC addresses, client IP address, and client lease times. Other parameters are possible as well, for example, client location, client name, and others.

The redundant aggregation devices provide client information to a client information requesting gateway. The client information requesting gateway is typically a gateway of a new subnet the client device has roamed to. For one embodiment, the requesting or new gateway determines an IP address of the client from a MAC address of the client based on the client information stored in the gateways that were designated as redundant aggregation devices.

The redundant aggregation devices maintain a MAC-address-to-IP-address mapping for all client devices attached to the network. The address mapping can be stored in an address mapping table that can be arranged to be synchronized across all the servers. This address mapping table can be referred to as an AARP Table (AARP=Anti-ARP). ARP is generally is a protocol for the resolution of IP addresses to MAC addresses. Here, anti-ARP (AARP) is a protocol for the resolution of MAC addresses to IP addresses An access node or gateway can query one of the redundant aggregation devices to determine the IP address corresponding to the MAC address of one of the client devices attached (in communication) to the access node. Generally, the redundant aggregation device responds with the IP address of the client device (if this entry exists in its AARP Table).

Generally, the requesting gateway functions as an AARP Client. The redundant aggregation device acts as an AARP Server when responding to AARP Requests from an a Gateway and as an AARP Client when sending AARP Requests to another Gateway. The service requested is the determination of the IP address corresponding to a given MAC address. Therefore, the service request is termed AARP (Anti-ARP), as opposed to ARP which is a protocol for the resolution of IP addresses to MAC addresses.

As previously described, the number of gateways selected as redundant aggregation devices is much smaller than the total number of gateways. That is, for example, for M gateways of a wireless network, N redundant aggregation devices can be selected based on the gateway parameters, where N is much smaller than M. However, N is typically greater than two.

If one of the selected redundant aggregation devices fails, a new gateway is selected as a replacement redundant aggregation device. The selection process for the replacement aggregation devices is similar to the original redundant aggregation devices selection process. The replacement aggregation device is selected from amongst the gateways that have not been previously selected. The selection process includes monitoring parameters of the previously unselected gateways. Parameters that can be monitored include, for example, a gateway uptime, how recently a database of the gateway has been updated, back haul link performance and a gateway priority. Generally, the gateways advertise these parameters.

All potential aggregation devices monitor activity of the redundant aggregation devices. If one of the selected redundant aggregation devices fails, then the remaining non-selected aggregation devices simultaneously run the selection process to identify or select replacement selected redundant aggregation devices. The process of selecting redundant aggregation devices is distributed amongst the available aggregation devices. Therefore, the processing is de-centralized and not reliant on any single server or router.

Figure 4:
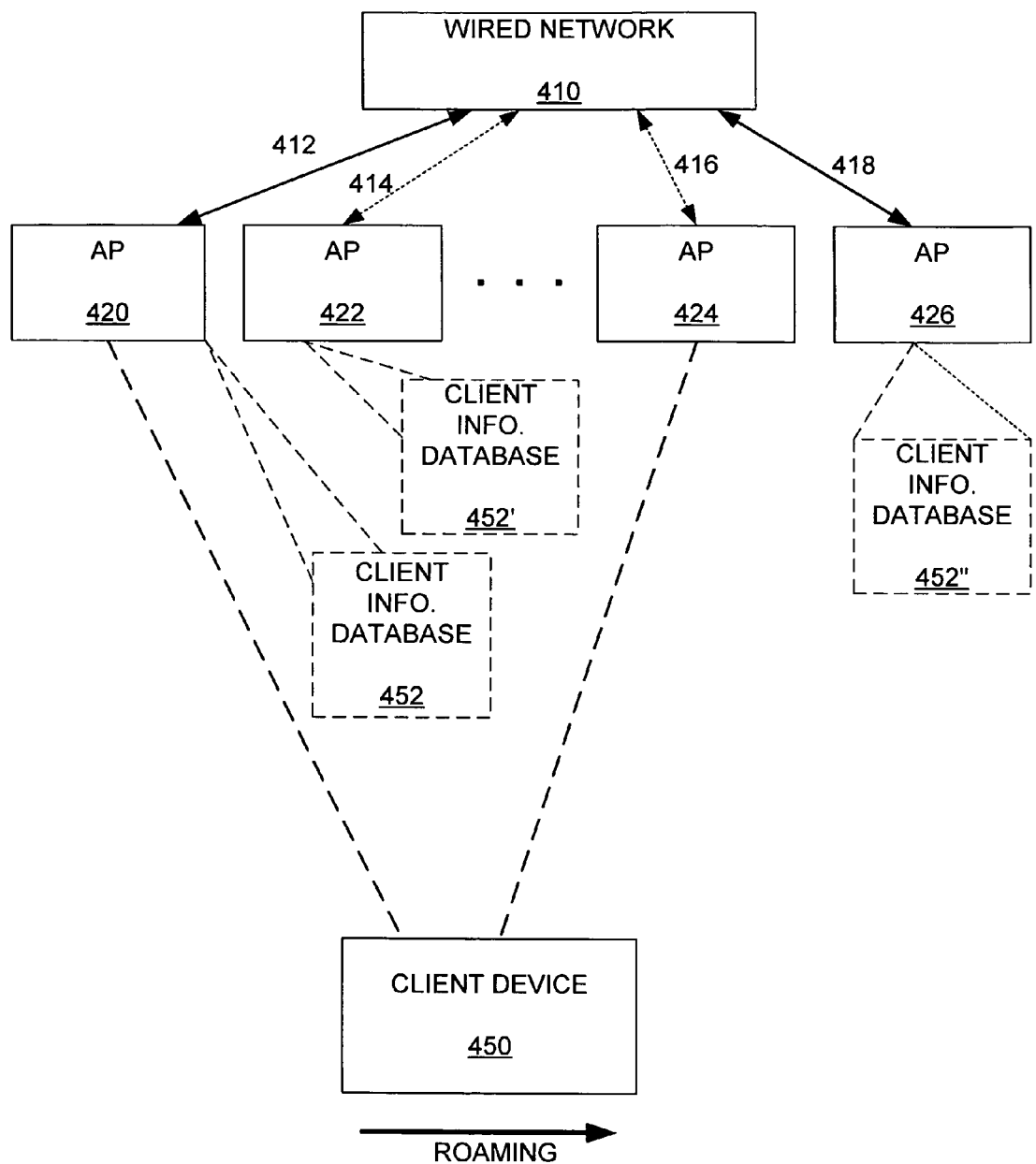
FIG. 4 shows an example of a wireless network that includes access points that are selected as redundant aggregation devices.

FIG. 4 shows another example of a wireless network that includes selected redundant aggregation devices. This wireless network includes all first-level access points. That is, all of the access points 420, 422, 424, 426 are directly connected to a wired network 410. A selected subset of the access points, for example access points 420, 422, 426 are selected as redundant aggregation devices. Each redundant aggregation device includes a client information database 452, 452', 452".

When the client device 450 roams from a first access point 420 to a second access point 422, the new access point 422 obtains information about the client from one of the selected access point that are redundant aggregation devices.

The method of FIG. 3 can be used to select which of the access points of FIG. 4 are to be designated as redundant aggregation devices.

Figure 5:
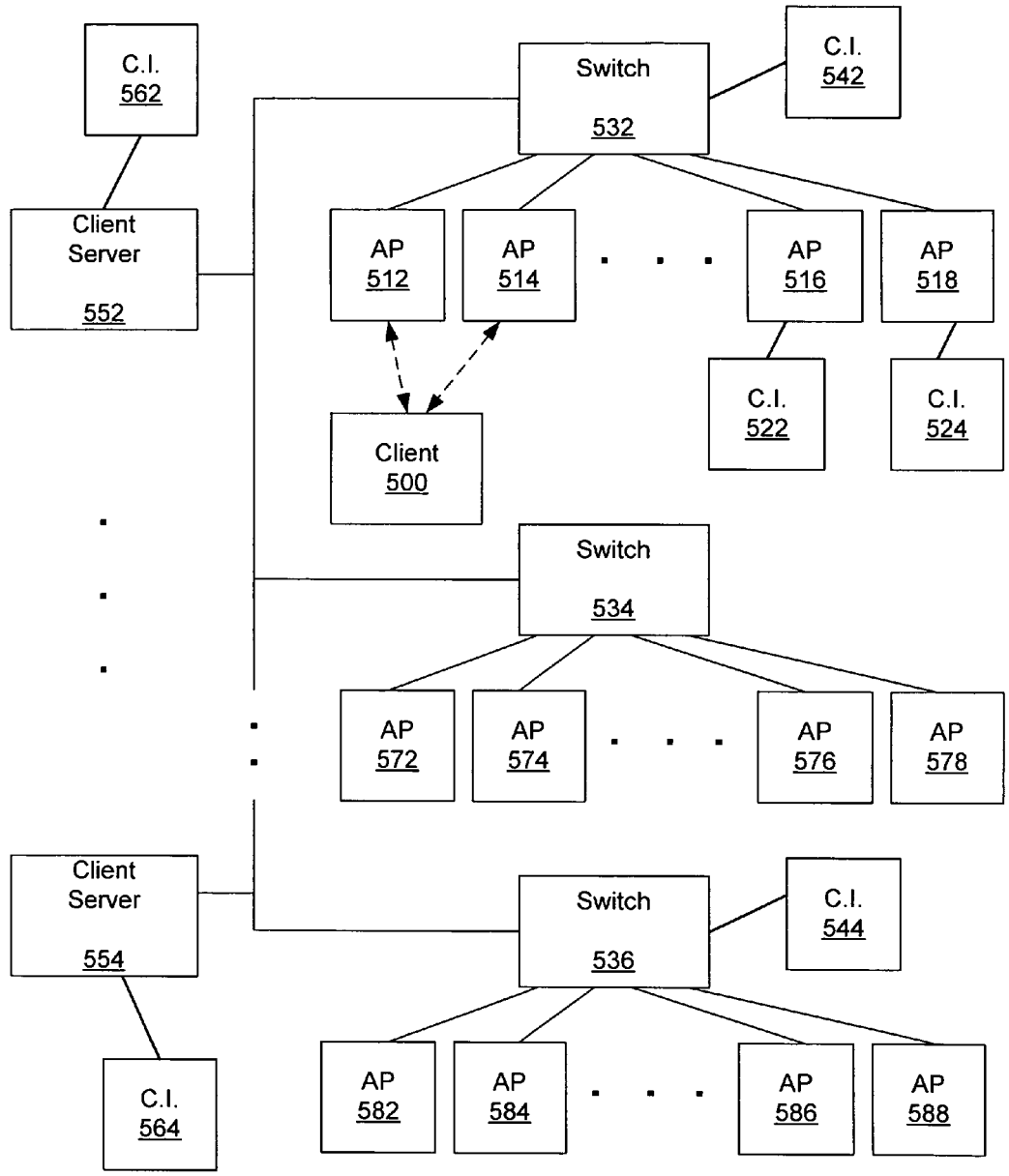
FIG. 5 shows another example of a wireless network that includes redundant aggregation devices.

FIG. 5 shows another example of a wireless network that includes redundant aggregation devices. This network includes higher level devices, such as, switches 532, 534, 536 and client servers 552, 554 that can additionally or alternatively be selected as redundant aggregation devices.

As shown, a first set of redundant aggregation devices includes access points 516, 518. The access points 516, 518 include the client information databases 522, 524. If a client 500 roams, for example, from a first access point 512 to a second access point 514, the second access point 514 can access client information of the client 500 from one of the databases 522, 524 of the redundant aggregation devices (access points) 516, 518. Therefore, the network can provide the client with a seamless roam from one access point to another access point.

A second set of redundant aggregation devices includes switches 532, 536. The switches 532, 536 include client information databases 542, 544. The client information databases 542, 544 are accessed when the client device roams from one switch to another switch.

A third set of redundant aggregation devices includes client servers 552, 554. The client servers 552, 554 include client information databases 562, 564. The client information databases 562, 564 are accessed when the client device roams from one client server to another client server.

Figure 6:
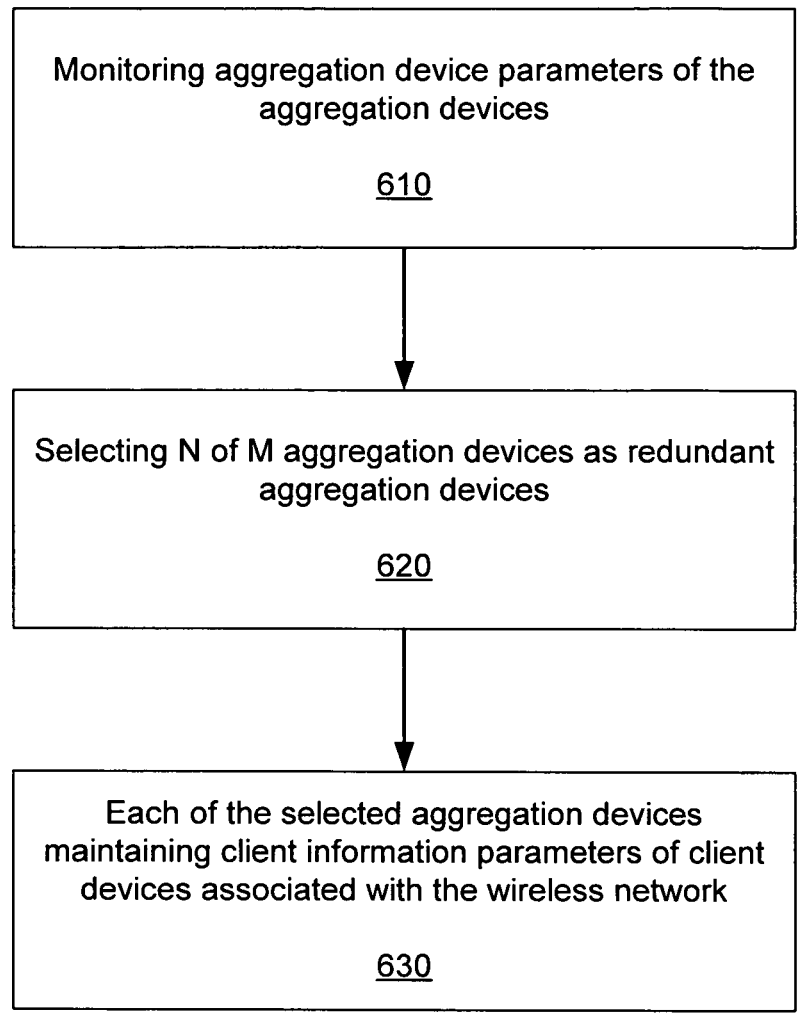
FIG. 6 shows is a flow chart that shows steps of an example of selecting designated redundant aggregation devices of a wireless network.

FIG. 6 shows is a flow chart that shows steps of an example of selecting redundant aggregation devices of a wireless network, for maintaining client information parameters of clients associated with a wireless network. A first step 610 includes monitoring aggregation device parameters of the aggregation devices. A second step 620 includes selecting N of M aggregation devices as redundant aggregation devices. A third step 630 includes each of the selected aggregation devices maintaining client information parameters of client devices associated with the wireless network.

Monitoring the aggregation device parameters includes monitoring at each gateway of the wireless network, a gateway uptime, how recently a database of the gateway has been updated, and/or a gateway priority. Other aggregation device parameters can be monitored as well.

The client information parameters include client MAC addresses, client IP address, and client lease times. Other client information parameters can be monitored as well.

The plurality of the aggregation devices that have been selected as a redundant aggregation device can provide client information to a client information requesting aggregation device. That is, the requesting aggregation device can obtain client information from any of the redundant aggregation devices.

If one of the selected redundant aggregation devices fails, a new redundant aggregation device is selected as a replacement redundant aggregation device. The selection process for the replacement aggregation devices is similar to the original redundant aggregation devices selection process. The replacement aggregation device is selected from amongst the aggregation devices that have not been previously selected. The selection process includes monitoring parameters of the previously unselected aggregation devices. Parameters that can be monitored include, for example, a device uptime, how recently a database of the device has been updated, back haul link performance and a device priority. Generally, the devices advertise these parameters.

Although specific embodiments of the invention have been described and illustrated, the invention is not to be limited to the specific forms or arrangements of parts so described and illustrated. The invention is limited only by the appended claims.

What is claimed:

1. A method of selecting access points of a wireless network as redundant aggregation devices, the access points providing clients with access to the wireless network, comprising:
    monitoring, by M access points that are available as redundant aggregation devices, parameters of the access points;
    selecting, by the M access points, a plurality of N access points as redundant aggregation devices based upon the monitored access point parameters, wherein each redundant aggregation device is connected to a wired network, and wherein a process of the selecting the redundant aggregation devices is distributed among the M access points, wherein N is greater than two but less than M;
    wherein each of the redundant aggregation devices stores redundant client information for access when a client device roams to a new access point;
    sensing, by the M access points, when one of the selected N aggregation devices fails;
    selecting a replacement access point as a replacement redundant aggregation device based upon the monitored access point parameters, wherein a selection process for selecting the replacement access point is run by access points that are connected to the wired network, and that are not selected as redundant aggregation devices.

2. The method of claim 1, wherein monitoring parameters of the access points comprises monitoring at each access point of the wireless network, at least one of an access point uptime, how recently a database of the access point has been updated, and an access point priority.

3. The method of claim 1, wherein the client information parameters include client MAC addresses, client IP address, and client lease times.

4. The method of claim 1, wherein the N redundant aggregation devices provide client information to a client information requesting access point.

5. The method of claim 4, wherein the client information requesting access point is a new access point of a roaming client.

6. The method of claim 5, wherein the client information requesting access point determines an IP address of the client from a MAC address of the client based on the client information stored in the N redundant aggregation devices.

7. A wireless network that includes redundant aggregate devices for maintaining client information parameters of clients associated with a wireless network, comprising:
M access points that are available as redundant aggregation devices of the wireless network, wherein the M access point are operative to monitor aggregation device parameters of the access points;
the M access points of the wireless network further operative to select N of the M access points as redundant aggregation devices, wherein each redundant aggregation device is connected to a wired network, and wherein a process for selecting the N redundant aggregation devices is distributed among the M access points, wherein N is greater than two and less than M; and
wherein each of the redundant aggregation devices stores redundant client information for access when a client device roams to a new access point;
the M access points further operative to sense when one of the selected aggregation devices fails;
access points that are connected to the wired network, and that are not selected as redundant aggregation devices, operative to select a replacement aggregation device as a replacement redundant aggregation device based upon the monitored access point parameter.

8. The wireless network of claim 7, wherein monitoring the aggregation device parameters comprises monitoring at each gateway of the wireless network, at least one of a gateway uptime, how recently a database of the gateway has been updated, and a gateway priority.

9. The wireless network of claim 7, wherein the client information parameters include client MAC addresses, client IP address, and client lease times.

10. The wireless network of claim 7, the redundant aggregation devices provide client information to a client information requesting aggregation device.

11. A method of selecting gateways of a wireless mesh network as redundant aggregate devices comprising:
monitoring, by M gateways, parameters of the gateways, wherein each gateway is connected to a wired network;
selecting, by the M gateways, a plurality of N gateways as redundant aggregation devices based upon the monitored gateway parameters, wherein a process for selecting the N gateways as redundant aggregation devices is distributed among the M gateways of the wireless mesh network, wherein N is greater than two and less than M;
wherein each of the redundant aggregation devices stores redundant client information for access when a client device roams to a new access point;
sensing, by the M gateways, when one of the selected aggregation devices fails;
selecting a replacement gateway as a replacement redundant aggregation device based upon the monitored access point parameters, wherein a selection process for selecting the replacement gateway is run by gateways that are connected to the wired network, and that are not selected as redundant aggregation devices; wherein
the wireless mesh network comprises gateways and downstream wireless access nodes.

12. The method of claim 11, wherein monitoring the gateway parameters comprises monitoring at each gateway of the wireless network, at least one of a gateway uptime, how recently a database of the gateway has been updated, and a gateway priority.

13. The method of claim 11, wherein the client information parameters include client MAC addresses, client IP address, and client lease times.

14. The method of claim 11, wherein the M redundant aggregation devices provide client information to a client information requesting gateway.

15. The method of claim 11, wherein the M redundant aggregation devices provide client information to a client information requesting gateway.

16. The method of claim 15, wherein the client information requesting gateway is a new gateway access point of a roaming client, or a gateway of an access point access node.

17. The method of claim 15, wherein the client information requesting gateway determines an IP address of the client from a MAC address of the client based on the client information stored in the gateways that were designated as redundant aggregation devices.

18. The method of claim 11, wherein each gateway defines a subnet, and a client information requesting gateway is within a new subnet of a roaming client.

\* \* \* \* \*